United States Patent
Wild et al.

(10) Patent No.: US 7,146,268 B2
(45) Date of Patent: Dec. 5, 2006

(54) METHOD AND DEVICE FOR OPERATING AN INTERNAL COMBUSTION ENGINE HAVING EXHAUST-GAS RECIRCULATION

(75) Inventors: Ernst Wild, Oberriexingen (DE); Michael Drung, Muehlacker (DE); Rainer Hild, Löhnberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/181,967

(22) Filed: Jul. 13, 2005

(65) Prior Publication Data
US 2006/0011178 A1 Jan. 19, 2006

(30) Foreign Application Priority Data
Jul. 13, 2004 (DE) .................. 10 2004 033 845

(51) Int. Cl.
*F02D 42/22* (2006.01)
*F02M 25/07* (2006.01)
(52) U.S. Cl. .................. 701/107; 701/108; 123/568.16
(58) Field of Classification Search ........... 123/568.11, 123/568.14, 568.16, 568.22, 389, 383, 350; 701/102, 103, 107, 110, 114, 115; 73/118.1, 73/118.2; 702/94, 95, 98
See application file for complete search history.

(56) References Cited

U.S. PATENT DOCUMENTS 6,170,475 B1 * 1/2001 Lewis et al. ........... 123/568.21
6,378,515 B1 * 4/2002 Geyer ..................... 123/683
6,763,708 B1 * 7/2004 Ting et al. .................. 73/118.1
2003/0075158 A1 * 4/2003 Milos et al. ........... 123/568.21

FOREIGN PATENT DOCUMENTS

DE 198 44 086 11/1999
WO 96 32579 10/1996

* cited by examiner

Primary Examiner—Andrew M. Dolinar
Assistant Examiner—Johnny H. Hoang
(74) Attorney, Agent, or Firm—Kenyon & Kenyon LLP (57) ABSTRACT

A method and a device for operating an internal combustion engine having exhaust-gas recirculation are provided, which make it possible to dispense with an ambient-pressure sensor. In this context, an intake-manifold pressure and an ambient pressure are modeled. The intake-manifold pressure is modeled as a function of the modeled ambient pressure. The intake-manifold pressure is also measured. The modeled intake-manifold pressure is compared to the measured intake-manifold pressure. The modeled ambient pressure is adapted as a function of the comparison result. The modeled ambient pressure is adapted only when the exhaust-gas recirculation is inactive.

9 Claims, 4 Drawing Sheets

METHOD AND DEVICE FOR OPERATING AN INTERNAL COMBUSTION ENGINE HAVING EXHAUST-GAS RECIRCULATION

FIELD OF THE INVENTION

The present invention relates to a method and a device for operating an internal combustion engine having exhaust-gas recirculation.

BACKGROUND INFORMATION

PCT Published International Application No. 96/32579 describes a method for the model-based determination of the air mass flowing into the cylinders of an internal combustion engine. The air mass actually flowing into the cylinder is calculated with the aid of an intake-manifold-fill model which, from the following input variables: throttle-valve opening angle, ambient pressure and parameters that represent the valve timing, delivers a load value, based on which, the injection time is determined. Both the intake-manifold pressure and the ambient pressure are modeled in the method indicated.

A device for controlling an internal combustion engine is described in German Published Patent Application No. 198 44 086. Internal combustion engine 1 has at least one cylinder, an intake tract and a tank ventilation device that communicates with the intake tract. A dynamic model of the internal combustion engine is provided for calculating the intake-manifold pressure and/or a mass flow into the cylinder of the internal combustion engine. The model is a function in particular of the mass flow through a throttle valve and a mass flow resulting from an internal exhaust-gas recirculation. In this instance, the intake-manifold pressure is modeled as a function of these two variables.

Moreover, internal combustion engines having external exhaust-gas recirculation are already sufficiently known, as well. It is the external exhaust-gas recirculation that is meant when talking in the following about exhaust-gas recirculation.

SUMMARY OF THE INVENTION

In contrast, the method of the present invention and the device of the present invention for operating an internal combustion engine featuring exhaust-gas recirculation have the advantage that an intake-manifold pressure and an ambient pressure are modeled; the intake-manifold pressure is modeled as a function of the modeled ambient pressure; in addition, the intake-manifold pressure is measured; the modeled intake-manifold pressure is compared to the measured intake-manifold pressure; and the modeled ambient pressure is adapted as a function of the comparison result, the modeled ambient pressure being adapted only when the exhaust-gas recirculation is inactive. In this way, it is possible to dispense with an ambient-pressure sensor for measuring the ambient pressure, and nevertheless, an ambient-pressure value can be modeled which is exact to the greatest extent possible. The modeled ambient pressure then corresponds approximately to the actual ambient pressure. Using an ambient pressure modeled reliably to such an extent, the internal combustion engine may be controlled precisely and faultlessly. Interfering influence of the exhaust-gas recirculation on the adaptation of the modeled ambient pressure is thereby prevented.

It is particularly advantageous if, in addition, the intake-manifold pressure is modeled as a function of an air-mass flow via an actuator, preferably a throttle valve, in an air feed of the internal combustion engine; if the modeled intake-manifold pressure is compared to the measured intake-manifold pressure; and if a leakage air-mass flow via the actuator in the air feed is adapted as a function of the comparison. In this way, a leakage of the actuator, which results because the actuator is not closing tightly, may be taken into account for the triggering of the actuator in the air feed. In this context, the leakage air-mass flow is adapted with the aid of the modeled intake-manifold pressure, which in turn is modeled as a function of the modeled ambient pressure, so that no ambient-pressure sensor is necessary for the adaptation of the leakage air-mass flow via the actuator in the air feed.

It is especially advantageous if the leakage air-mass flow via the actuator in the air feed is adapted only when an exhaust-gas recirculation is inactive. In this way, when adapting the leakage air-mass flow via the actuator in the air feed, errors are prevented from resulting because of an adaptation of the exhaust-gas recirculation which was either not carried out or is faulty.

It is further advantageous if an error is recognized in the event the adapted leakage air-mass flow via the actuator in the air feed lies outside of a first predefined range. In this way, an undesirably high leakage air-mass flow via the actuator in the air feed can be recognized, and an error measure can be carried out such as operation of the internal combustion engine under emergency conditions or, as a last consequence, switching off the internal combustion engine.

A further advantage is yielded if, in addition, the intake-manifold pressure is modeled as a function of an air-mass flow via an actuator, preferably an exhaust-gas recirculation valve, in an exhaust-gas recirculation line of the internal combustion engine; if the modeled intake-manifold pressure is compared to the measured intake-manifold pressure; and if a leakage mass flow via the actuator in the exhaust-gas recirculation line is adapted as a function of the comparison. In this way, a leakage of the actuator, which results because the actuator is not closing tightly or because of the deposit of solid exhaust-gas components such as soot, is taken into account for the triggering of the actuator in the exhaust-gas recirculation line. The leakage mass flow via the actuator in the exhaust-gas recirculation line is adapted with the aid of the modeled intake-manifold pressure, which in turn is modeled as a function of the modeled ambient pressure, so that no ambient-pressure sensor is necessary for the adaptation of the leakage mass flow via the actuator in the exhaust-gas recirculation line.

In this context, it is particularly advantageous if the leakage mass flow via the actuator in the exhaust-gas recirculation line is adapted only after previous adaptation of the leakage air-mass flow via the actuator in the air feed. This ensures that the adaptation of the leakage mass flow via the actuator in the exhaust-gas recirculation line is not invalidated by a non-adapted or incorrectly-adapted leakage air-mass flow via the actuator in the air feed.

A special advantage results if an error is recognized in the event the adapted leakage mass flow via the actuator in the exhaust-gas recirculation line lies outside of a predefined range. In this way, an undesirably high leakage mass flow via the actuator in the exhaust-gas recirculation line can be recognized, and an error measure can be carried out such as operation of the internal combustion engine under emergency conditions or, as a last consequence, switching off the internal combustion engine.

It is further advantageous if the exhaust-gas recirculation is switched off at full load or after a predefined time has elapsed, and that the modeled ambient pressure is subsequently adapted. In this way, the modeled ambient pressure may be adapted in an operating range of the internal combustion engine, namely, the full-load operating range, in which the exhaust-gas recirculation is switched off anyway, so that it is not necessary to depart from the normal operation of the internal combustion engine in order to adapt the modeled ambient pressure. Should such an operating state of the internal combustion engine not arise, then the modeled ambient pressure may still preferably be adapted at regular intervals, in that after the predefined time since the beginning of activation of the exhaust-gas recirculation has elapsed, the exhaust-gas recirculation is switched off and the modeled ambient pressure is subsequently adapted. After the adaptation of the modeled ambient pressure has ended, the exhaust-gas recirculation may then be activated again, provided in the meantime, a full-load operating state is not present.

DETAILED DESCRIPTION

Figure 1:
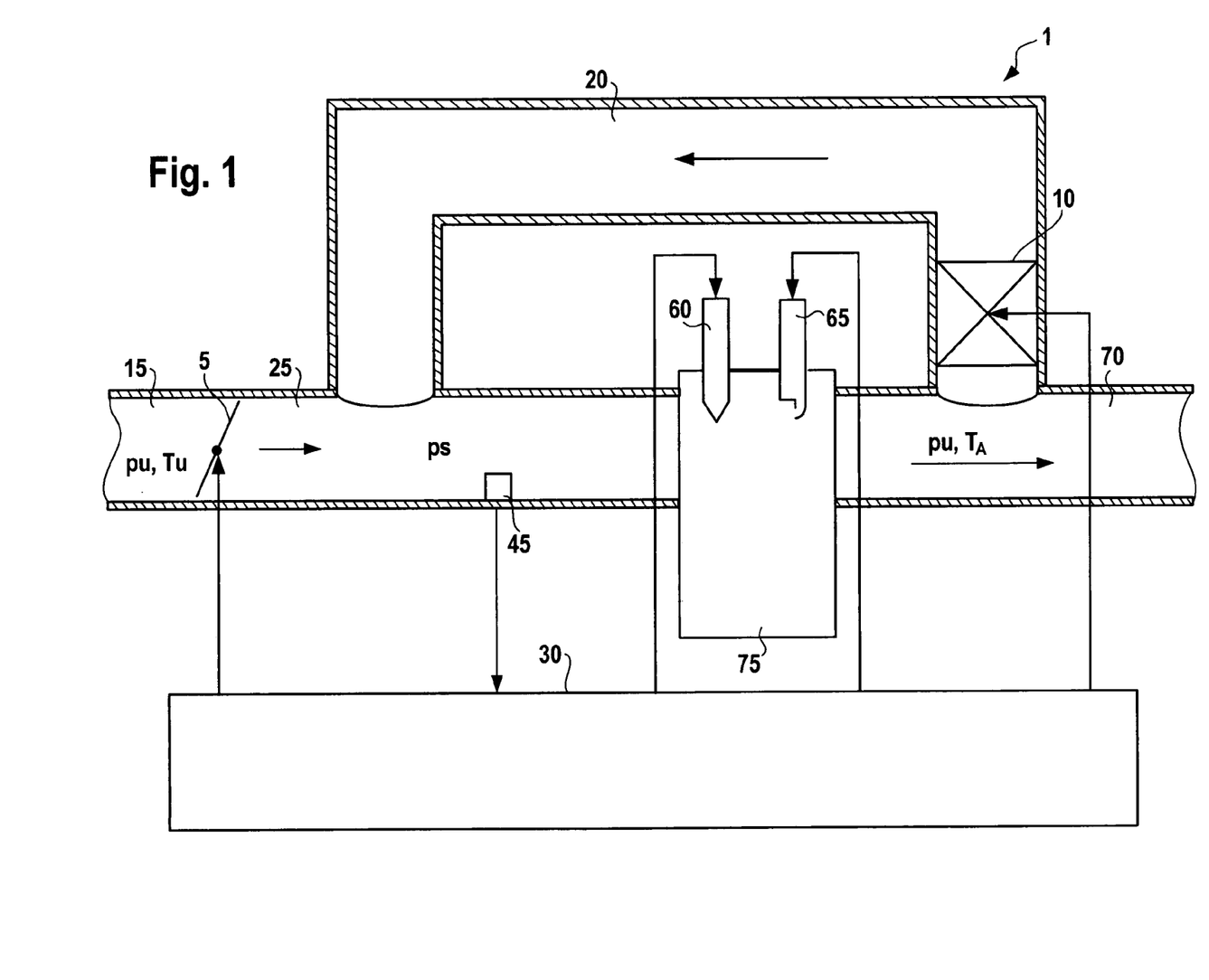
FIG. 1 shows a schematic view of an internal combustion engine having exhaust-gas recirculation.

In FIG. 1, reference numeral 1 designates an internal combustion engine which, for example, propels a vehicle. Internal combustion engine 1 may take the form of, e.g., a spark-ignition engine or a diesel engine. In the following, it is assumed by way of example that internal combustion engine 1 is in the form of a spark-ignition engine. Spark-ignition engine 1 includes at least one cylinder 75, to which fresh air is supplied via an air feed 15. The flow direction of the fresh air in air feed 15 is indicated in FIG. 1 by an arrow. Disposed in air feed 15 is an actuator 5, by which it is possible to influence an air-mass flow to cylinder 75. In the following, it is assumed by way of example that actuator 5 is in the form of a throttle valve. Throttle valve 5 is triggered by an engine management 30 for adjusting a predefined opening degree. In this context, the opening degree of throttle valve 5 may be predetermined for adjusting a predefined air-mass flow in a manner familiar to one skilled in the art. The predefined air-mass flow may be formed in the manner familiar to one skilled in the art, as a function of an internal-combustion-engine output variable to be set, e.g., a torque to be set or a power output to be set. The output variable of internal combustion engine 1 may be predefined in the manner known to one skilled in the art, e.g., as a function of a demand by the driver of the vehicle, or a further vehicle function such as an anti-lock braking system, a traction control system, an electronic stability program, etc. The demand the output variable of the internal combustion engine by the driver may be carried out, for example, by actuating an accelerator (not shown in FIG. 1), that is connected to engine management 30. The section of air feed 15 downstream of throttle valve 5 is also known as the intake manifold and is designated by reference numeral 25 in FIG. 1. Situated in intake manifold 25 is an intake-manifold pressure sensor 45 that measures intake-manifold pressure ps continuously or at regular intervals, and relays the measuring result to engine management 30. The fresh air is supplied to a combustion chamber of cylinder 75 via an intake valve (not shown in FIG. 1). Fuel is injected directly into the combustion chamber of cylinder 75 by a fuel injector 60. In so doing, fuel injector 60 is controlled by engine management 30, e.g., for maintaining a predefined air/fuel mixture ratio. Fuel may also be injected into intake manifold 25 or into air feed 15 upstream of throttle valve 5. The air/fuel mixture present in the combustion chamber of cylinder 75 is ignited by a spark plug 65. In so doing, spark plug 65 may likewise be triggered by engine management 30 for realizing a suitable moment of ignition. For example, the moment of ignition may be predefined in such a way that a reserve is realized for the output variable of internal combustion engine 1, e.g., a torque reserve for heating up a catalytic converter (not shown in FIG. 1) in an exhaust branch 70 of internal combustion engine 1. The exhaust gas formed during the combustion of the air/fuel mixture in the combustion chamber of cylinder 75 is discharged via an exhaust valve (not shown in FIG. 1) into exhaust branch 70. Exhaust branch 70 is connected to intake manifold 25 via an exhaust-gas recirculation line 20. Disposed in exhaust-gas recirculation line 20 is an exhaust-gas recirculation valve 10 that may likewise be controlled by engine management 30 for setting a desired exhaust-gas recirculation rate. The flow direction of the exhaust gas in exhaust-gas recirculation line 20 is denoted in FIG. 1 by an arrow, in the same way as the flow direction of the exhaust gas in exhaust branch 70. Further components of the internal combustion engine, such as a lambda probe in exhaust branch 70 for detecting the oxygen content in the exhaust gas, or a catalytic converter are not shown in FIG. 1 for the sake of clarity, and are not crucial for the functioning method of the invention. In FIG. 1, the pressure upstream of throttle valve 5 in air feed 15 is denoted by pu and corresponds approximately to the ambient pressure. Correspondingly, in FIG. 1, the temperature upstream of throttle valve 5 in the air feed is denoted by Tu, and is also known as the intake-air temperature. In this context, intake-air temperature Tu corresponds approximately to the ambient-air temperature and is the temperature of the intake air in the region of throttle valve 5. Prevailing in exhaust branch 70 are an exhaust-gas temperature $T_A$ and an exhaust-gas back pressure that corresponds approximately to ambient pressure pu, because the pressure drop across the catalytic converter (not shown in FIG. 1) in exhaust branch 70 is assumed to be negligible compared to ambient pressure pu.

Figure 2:
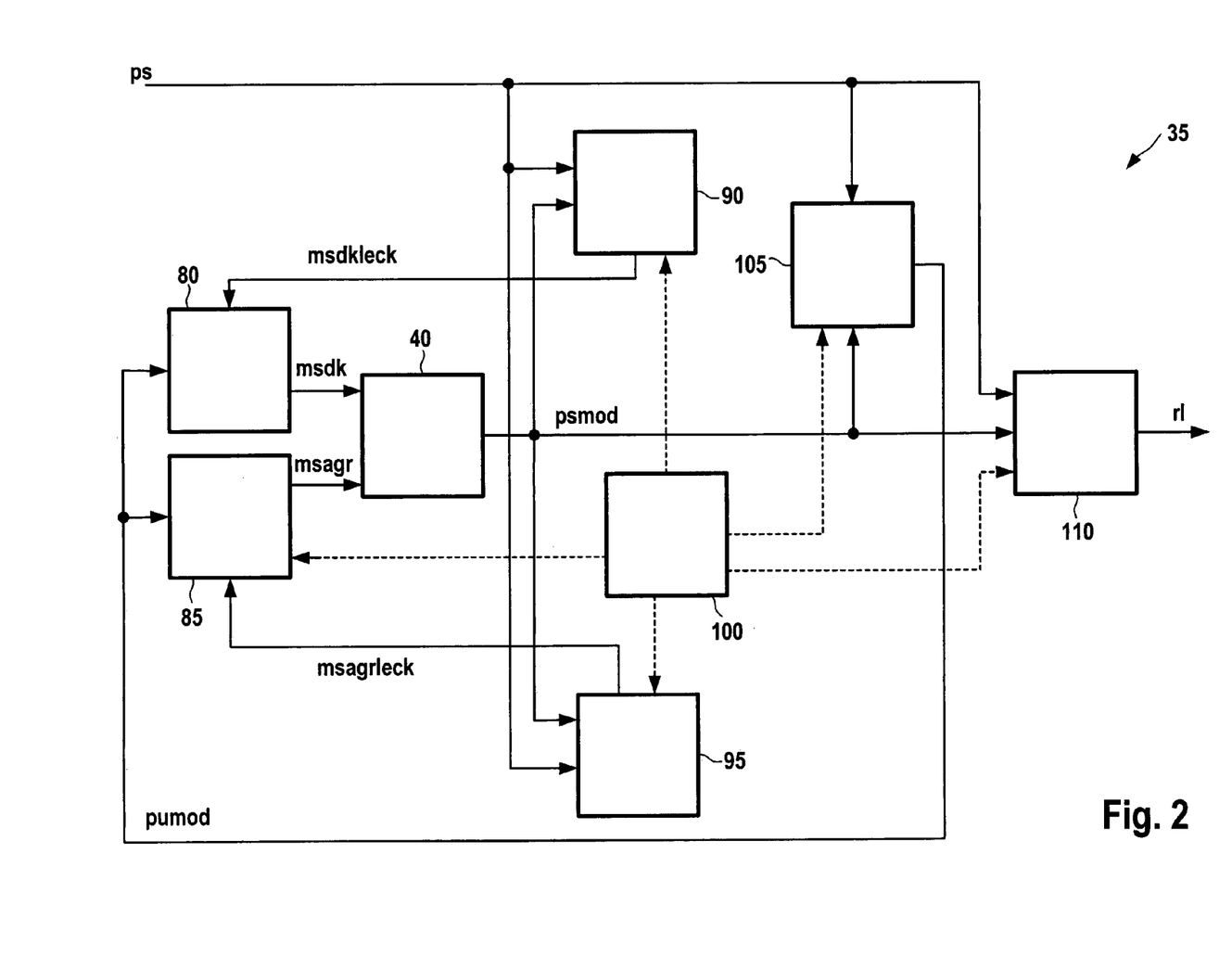
FIG. 2 shows a flow chart for illustrating the method of the present invention and the device of the present invention.

FIG. 2 shows a flow chart for a modeling unit 35, which may be implemented in the form of hardware and/or software in engine management 30. In modeling unit 35, an intake-manifold-pressure modeling unit 40 is provided which models the intake-manifold pressure and makes modeled intake-manifold pressure psmod available at its output. Modeling unit 35 also includes a throttle-valve mass-flow ascertainment unit 80 which models a mass flow msdk via throttle valve 5 and emits at its output. Modeled mass flow msdk via throttle valve 5 at the output of throttle-valve mass-flow ascertainment unit 80 is fed as input variable to intake-manifold-pressure modeling unit 40. Modeling unit 35 further includes an exhaust-gas-recirculation mass-flow ascertainment unit 85 which models a mass flow msagr via exhaust-gas recirculation valve 10 and emits at its output. Modeled mass flow msagr via exhaust-gas recirculation valve 10 at the output of exhaust-gas-recirculation mass-flow ascertainment unit 85 is fed as a further input variable to intake-manifold-pressure modeling unit 40. From these two input variables, intake-manifold-pressure modeling unit 40 models intake-manifold pressure psmod in a manner known, for example, from German Published Patent Application No. 198 44 086; still further input variables as known from German Published Patent Application No. 198 44 086, e.g., a mass flow at a tank vent valve (not shown in FIG. 1), may be used for modeling the intake-manifold pressure in intake-manifold-pressure modeling unit 40. It may be that the resulting mass flow $\dot{m}_{AGR}$ known from the document German Published Patent Application No. 198 44 086 relates to internal exhaust-gas recirculation and is indicated there in equation (F10). However, the equation (F10) in German Published Patent Application No. 198 44 086 may be used analogously for the external exhaust-gas recirculation required in the present case, if instead of the flow cross-section $A_{EV}$ at the intake valve, the flow cross-section of exhaust-gas recirculation valve 10 is used, and if instead of the flow-through function $\psi AG$ at the intake valve, the flow-through function at exhaust-gas recirculation valve 10 is used. Exhaust-gas pressure $p_{AG}$ in equation (F10) of German Published Patent Application No. 198 44 086 in the present case corresponds approximately to ambient pressure pu as shown in FIG. 1, and the exhaust-gas temperature denoted by $T_{AG}$ in German Published Patent Application No. 198 44 086, in the present case is temperature $T_A$ according to FIG. 1. With equation (F 10) of German Published Patent Application No. 198 44 086 thus modified, it is then possible to model external exhaust-gas mass flow msagr in exhaust-gas-recirculation mass-flow ascertainment unit 85. In this context, the flow cross-section of exhaust-gas recirculation valve 10 and the flow-through function at exhaust-gas recirculation valve 10 are known in engine management 30, whereas exhaust-gas temperature $T_A$ may be modeled from other performance quantities of internal combustion engine 1 in a manner familiar to one skilled in the art, or may be measured with the aid of a temperature sensor (not shown in FIG. 1) in exhaust branch 70. For the exhaust-gas pressure, which in the present case corresponds approximately to ambient pressure pu, an adapted, modeled ambient pressure pumod may be used, the modeling of the ambient pressure being known per se from PCT Published International Application No. 96/32579, for example.

Mass flow msdk via throttle valve 5 is modeled in analogous manner by throttle-valve mass-flow ascertainment unit 80, and is likewise described in German Published Patent Application No. 198 44 086, especially with the aid of equation (F5) therein, the ambient pressure being denoted there by $p_0$ and the temperature in the area of throttle valve 5 being denoted by $T_{L,0}$, whereas in the present case, the ambient pressure is denoted by pu, and the temperature in the area of throttle valve 5 by Tu. The variables according to equation (F5) of German Published Patent Application No. 198 44 086, such as flow cross-section $A_{DK}$ at throttle valve 5 and flow-through function $\psi_{DK}$ for throttle valve 5, which are needed for modeling air-mass flow msdk via throttle valve 5, are stored in engine management 30 and are therefore previously known. Intake-air temperature Tu in the area of throttle valve 5 may be modeled in a manner familiar to one skilled in the art, or measured by a temperature sensor (not shown in FIG. 1) in air feed 15 in the area of throttle valve 5. Adapted, modeled ambient pressure pumod may in turn be used for the ambient pressure. The variables necessary for ascertaining air-mass flow msdk via throttle valve 5 are fed to throttle-valve mass-flow ascertainment unit 80, just as the variables necessary for ascertaining exhaust-gas mass flow msagr via exhaust-gas recirculation valve 10 are fed to exhaust-gas-recirculation mass-flow ascertainment unit 85. For the sake of clarity, however, only adapted, modeled ambient pressure pumod is shown in FIG. 2 as input variable of throttle-valve mass-flow ascertainment unit 80 and of exhaust-gas-recirculation mass-flow ascertainment unit 85, because in the following, the formation of adapted, modeled ambient pressure pumod is discussed in particular. Modeling unit 35 includes an adaptation module 105 for the ambient pressure, to which are supplied, on one hand, modeled intake-manifold pressure psmod, and on the other hand, measured intake-manifold pressure ps.

Figure 3:
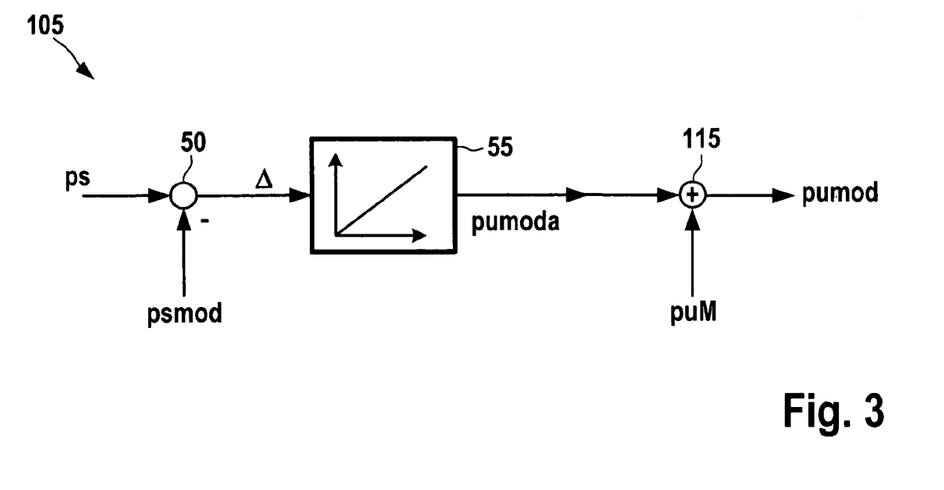
FIG. 3 shows a flow chart for illustrating an adaptation according to the method of the present invention and the device of the present invention.

FIG. 3 shows the design of adaptation module 105 in greater detail in the form of a flow chart. Adaptation module 105 includes a first subtraction element 50 in which intake-manifold pressure psmod, modeled by intake-manifold-pressure modeling unit 40, is subtracted from intake-manifold pressure ps measured by intake-manifold pressure sensor 45. In this way, a difference $\Delta$=ps−psmod results at the output of first subtraction element 50. Thus, first subtraction element 50 represents a comparison unit in which measured intake-manifold pressure ps is compared to modeled intake-manifold pressure psmod, and the comparison result in the form of difference $\Delta$ is passed on as an input variable to an adaptation unit 55 of adaptation module 105. Adaptation unit 55 may be in the form of a first integrator, for instance, and integrates difference $\Delta$ into an adaptation variable pumoda. Adaptation variable pumoda is added in a summing element 115 of adaptation module 105 to a value for ambient pressure puM, modeled in a manner familiar to one skilled in the art, to form at the output of summing element 115, the adapted, modeled ambient pressure pumod, which then according to FIG. 2, is fed to throttle-valve flow-ascertainment unit 80 for ascertaining air-mass flow msdk via throttle valve 5 in the way described, and to exhaust-gas-recirculation mass-flow ascertainment unit 85 for ascertaining exhaust-gas mass flow msagr via exhaust-gas-recirculation valve 10 in the way described. Instead of the addition of the modeled value for ambient pressure puM with adaptation variable pumoda in summing element 115, adaptation unit 55 as first integrator may also be initialized with the modeled value for ambient pressure puM. In this context, the modeling of the ambient pressure for forming value puM is known from PCT Published International Application No. 96/32579, and may, for example, be carried out as a function of performance quantities of the internal combustion engine.

By way of adaptation module 105 having first integrator 55, and the feedback of adapted, modeled ambient pressure pumod, in particular via throttle-valve mass-flow ascertainment unit 80 to intake-manifold-pressure modeling unit 40, a control loop is realized in which the adaptation of the modeled ambient pressure is terminated when difference $\Delta$ is minimal, preferably is equal to zero. Adapted, modeled ambient pressure pumod then present corresponds approximately to the actual ambient pressure. Thus, the use of an ambient-pressure sensor may be omitted.

Figure 5:
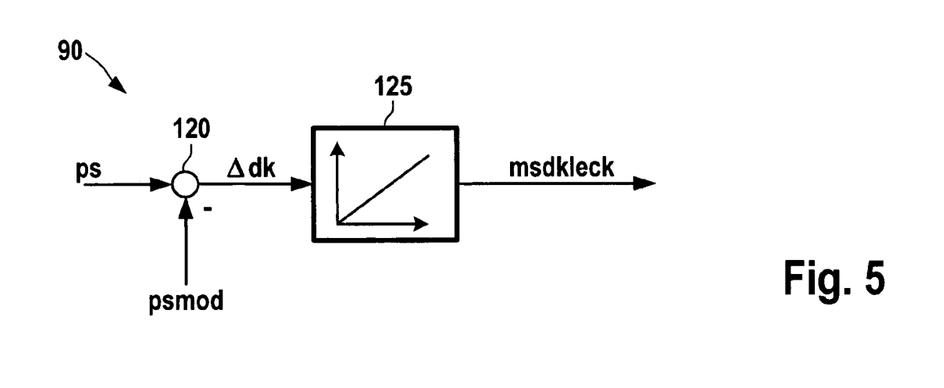
FIG. 5 indicates a flow chart for the adaptation of a leakage air-mass flow via a throttle valve.

Modeling unit 35 further includes a throttle-valve adaptation unit 90, to which modeled intake-manifold pressure psmod and measured intake-manifold pressure ps are likewise fed. FIG. 5 shows the functioning method of throttle-valve adaptation unit 90 with the aid of a flow chart. In this instance, in a second subtraction element 120, modeled intake-manifold pressure psmod is subtracted from measured intake-manifold pressure ps to form a difference $\Delta dk=ps-psmod$. This difference $\Delta dk$ is fed as input variable to a second integrator 125 which integrates it to form output variable msdkleck. The output of second integrator 125 therefore corresponds to a leakage air-mass flow via throttle valve 5, and is fed as input variable to throttle-valve mass-flow ascertainment unit 80. This leakage air-mass flow msdkleck is added to the air-mass flow via throttle valve 5, ascertained according to equation (F5) in German Published Patent Application No. 198 44 086, in order to form air-mass flow msdk at the output of throttle-valve mass-flow ascertainment unit 80, i.e., air-mass flow msdk via throttle valve 5 at the output of throttle-valve mass-flow ascertainment unit 80 is adapted with the aid of leakage air-mass flow msdkleck. Thus, with the aid of throttle-valve adaptation unit 90 and the feedback of leakage air-mass flow msdkleck via throttle valve 5, a control loop is also realized in which difference $\Delta dk$ at the output of second subtraction element 120 is minimized, preferably made zero, by forming a corresponding value for leakage air-mass flow msdkleck. By the adaptation of leakage air-mass flow msdkleck thus carried out, leaks of throttle valve 5 which lead to unwanted leakage air-mass flow msdkleck are taken into account. With the aid of air-mass flow msdk via throttle valve 5 formed in this manner, internal combustion engine 1 may therefore be controlled more precisely, because leakage air-mass flow msdkleck via throttle valve 5 is taken into consideration.

Figure 6:
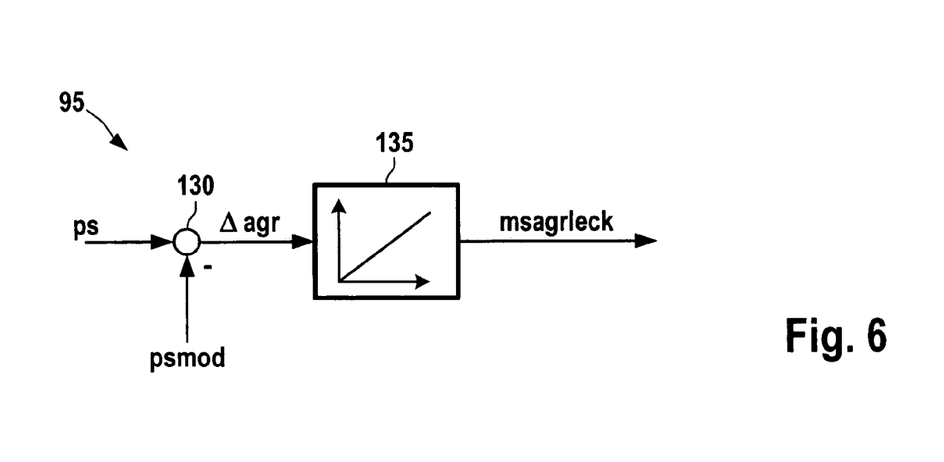
FIG. 6 shows a flow chart for the adaptation of a leakage mass flow via an exhaust-gas recirculation valve.

Modeling unit 35 further includes an exhaust-gas-recirculation adaptation unit 95, to which modeled intake-manifold pressure psmod and measured intake-manifold pressure ps are likewise fed. FIG. 6 shows a flow chart which more precisely clarifies the functioning method of exhaust-gas-recirculation adaptation unit 95. In this instance, exhaust-gas-recirculation adaptation unit 95 includes a third subtraction element 130 in which modeled intake-manifold pressure psmod is subtracted from measured intake-manifold pressure ps, in order to form difference $\Delta agr$ at the output of third subtraction element 130. This difference $\Delta agr$ is fed on the incoming side to a third integrator 135 which integrates difference $\Delta agr$ to form an adapted leakage mass flow msagrleck via exhaust-gas recirculation valve 10. Leakage mass flow msagrleck via exhaust-gas recirculation valve 10 adapted in this manner is fed to exhaust-gas-recirculation mass-flow ascertainment unit 85 and is added there to the value for the exhaust-gas mass flow via exhaust-gas recirculation valve 10, ascertained according to equation (F10) in German Published Patent Application No. 198 44 086, to form exhaust-gas mass flow msagr at the output of exhaust-gas-recirculation mass-flow ascertainment unit 85. In this context, the closed loop, formed by exhaust-gas-recirculation adaptation unit 95 and the feedback of adapted leakage mass flow msagrleck, is also used for minimizing difference $\Delta agr$ at the output of third subtraction element 30, preferably for setting this difference $\Delta agr$ to zero, by adaptation of a suitable leakage mass flow msagrleck via exhaust-gas recirculation valve 10 with the aid of third integrator 135. Therefore, by way of exhaust-gas mass flow msagr via exhaust-gas recirculation valve 10 at the output of exhaust-gas-recirculation mass-flow ascertainment unit 85, adapted leakage mass flow msagrleck via exhaust-gas recirculation valve 10 which results, e.g., because of leaks or dirt deposits in the area of exhaust-gas recirculation valve 10, is taken into account. Using an exhaust-gas mass flow msagr via exhaust-gas recirculation valve 10, corrected in such a manner by adapted leakage mass flow msagrleck, internal combustion engine 1 may likewise be controlled in a precise and error-free manner.

Moreover, modeled intake-manifold pressure psmod and measured intake-manifold pressure ps are fed to a fill-ascertainment unit 110 which calculates the fill of the combustion chamber of cylinder 75, linked to modeled intake-manifold pressure psmod or to measured intake-manifold pressure ps, as a function of further performance quantities of internal combustion engine 1 such as the engine speed. In this context, the engine speed may be ascertained, for instance, by an engine speed sensor (not shown in FIG. 1) in the area of cylinder 75, and the measured value passed on to engine management 30. The calculated fill is then passed on to further functional blocks of engine management 30 in a manner familiar to one skilled in the art, and is denoted in FIG. 2 by r1. Modeling unit 35 also includes a control unit 100 that is able to activate or deactivate various functional blocks of modeling unit 35. Thus, control unit 100 is able to activate or deactivate exhaust-gas-recirculation mass-flow ascertainment unit 85, throttle-valve adaptation unit 90, exhaust-gas-recirculation adaptation unit 95 and adaptation module 105, and in addition, control 100 is able to trigger fill-ascertainment unit 110 for the selection of measured intake-manifold pressure ps or modeled intake-manifold pressure psmod for ascertaining fill r1. The control strategy of control unit 100 is illustrated by way of example on the basis of various diagrams according to FIGS. 4a), 4b), 4c) and 4d).

Figure 4:
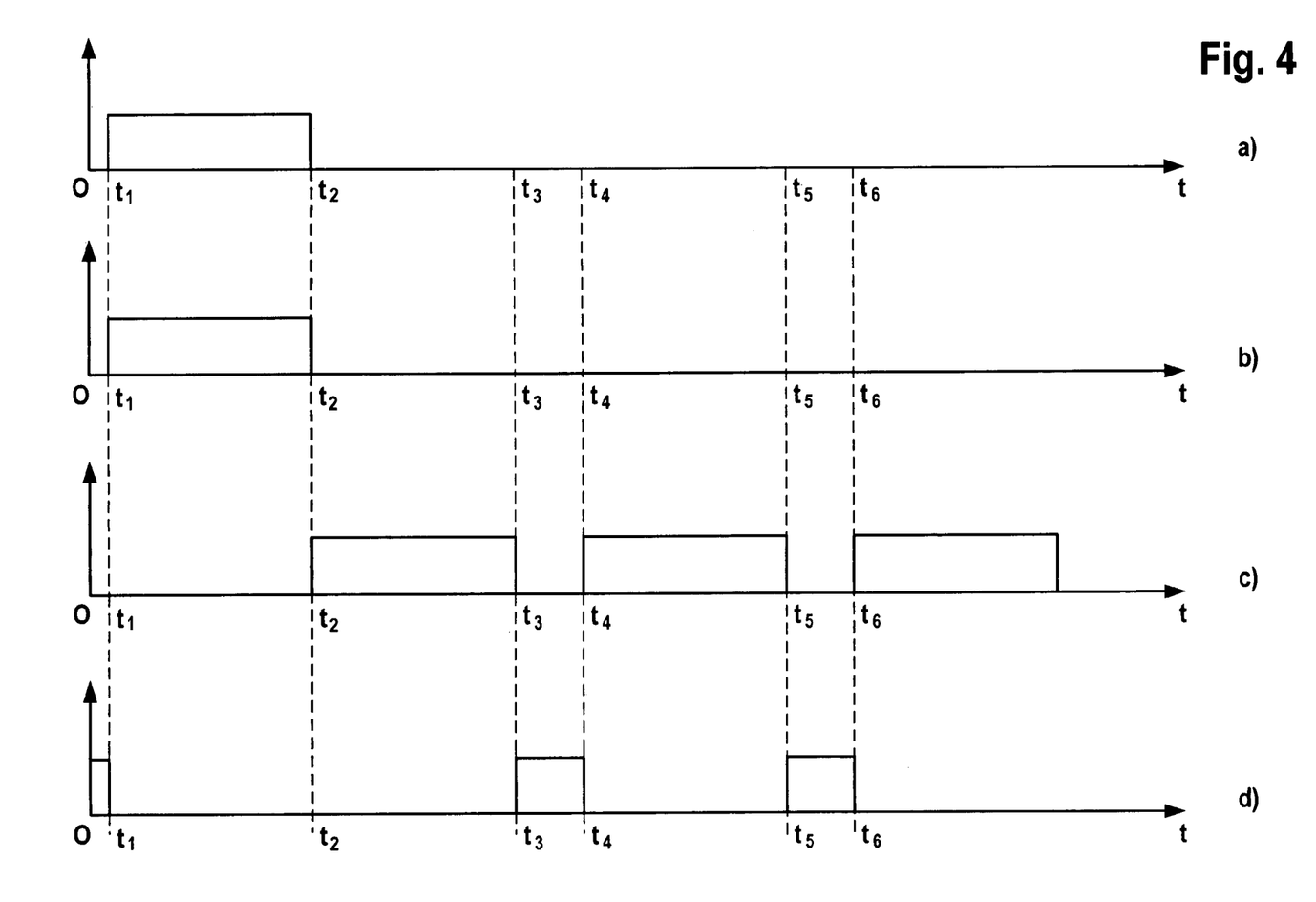
FIG. 4*a* shows a timing diagram of an activation of an adaptation for the throttle valve.
FIG. 4*b* shows a timing diagram for a selection of a fill recording based on a measured or a modeled intake-manifold pressure.
FIG. 4*c* shows a timing diagram of an activation of an exhaust-gas recirculation and an adaptation of the exhaust-gas recirculation.
FIG. 4*d* shows a timing diagram for an activation of an adaptation of a modeled ambient pressure.

The timing diagram according to FIG. 4a) shows for which points of time since the start of internal combustion engine 1 at a point of time t=0, an adaptation of leakage air-mass flow msdkleck is carried out. Based on a timing diagram, FIG. 4c) shows at what points of time since the start of internal combustion engine 1 at point of time t=0, the exhaust-gas recirculation is active, i.e., exhaust-gas recirculation valve 10 is triggered by engine management 30 so that it has an opening degree which is different from a completely closed position of exhaust-gas recirculation valve 10, and at what points of time the adaptation of leakage mass flow msagrleck via exhaust-gas recirculation valve 10 is active. Using a timing diagram, FIG. 4d) shows at what points of time since the start of internal combustion engine 1 at point of time t=0, the formation of adapted, modeled ambient pressure pumod is active. FIG. 4b) shows at what points of time since the start of internal combustion engine 1 at point of time t=0, the fill is ascertained by fill-ascertainment unit 110 on the basis of measured intake-manifold pressure ps, and at what points of time fill r1 is ascertained by fill-ascertainment unit 110 on the basis of modeled intake-manifold pressure psmod. In this context, it is provided according to the example in FIG. 4d) that, immediately upon the start of internal combustion engine 1 at point of time t=0 up to a first point of time $t_1$, the formation of adapted, modeled ambient pressure pumod by adaptation module 105 is active. At first point of time $t_1$, this adaptation is completed, and therefore is ended at first point of time $t_1$. With the termination of the formation of adapted, modeled ambient pressure pumod at first point of time $t_1$, according to FIG. 4a), the adaptation of leakage air-mass flow msdkleck by throttle-valve adaptation unit 90 is activated and remains active up to a subsequent second point of time $t_2$. At second point of time $t_2$, the adaptation of leakage air-mass flow msdkleck is concluded, i.e., difference Δdk at point of time $t_2$ has become =0 or minimal, so that the adaptation of leakage air-mass flow msdkleck may be terminated at second point of time $t_2$. As long as the adaptation of leakage air-mass flow msdkleck is active, according to FIG. 4b), fill r1 is ascertained by fill-ascertainment unit 110 on the basis of measured intake-manifold pressure ps. At the remaining times, fill r1 is ascertained by fill-ascertainment unit 110 on the basis of modeled intake-manifold pressure psmod. At the end of the adaptation of leakage air-mass flow msdkleck at second point of time $t_2$, the exhaust-gas recirculation is activated by opening exhaust-gas recirculation valve 10 from the completely closed state. At the same time, the adaptation of leakage mass flow msagrleck via the exhaust-gas recirculation valve by exhaust-gas-recirculation adaptation unit 95 is activated. The exhaust-gas recirculation and the adaptation of leakage mass flow msagrleck remain active up to a subsequent third point of time $t_3$, at which difference Δagr has become zero or minimal. Therefore, at third point of time $t_3$, as shown in FIG. 4c), the adaptation of leakage mass flow msagrleck and also the exhaust-gas recirculation may be deactivated by completely closing exhaust-gas recirculation valve 10. With this deactivation of the exhaust-gas recirculation and of the adaptation of leakage mass flow msagrleck at third point of time $t_3$, the formation of adapted, modeled ambient pressure pumod is in turn activated according to FIG. 4d). This is concluded at a subsequent fourth point of time $t_4$; i.e., at fourth point of time $t_4$, as also at first point of time $t_1$, difference Δ has become zero or minimal. Therefore, at fourth point of time $t_4$, the formation of the adapted, modeled ambient pressure may be deactivated, whereupon, at fourth point of time $t_4$, the exhaust-gas recirculation is in turn activated by opening exhaust-gas recirculation valve 10, just as the adaptation of leakage mass flow msagrleck. At a subsequent fifth point of time $t_5$, the adaptation of leakage mass flow msagrleck is ended again, because difference Δagr has become zero or minimal, so that at fifth point of time $t_5$, the exhaust-gas recirculation and the adaptation of leakage mass flow msagrleck may be deactivated again, and the formation of adapted, modeled ambient pressure pumod may be activated once more. The adaptation of the modeled ambient pressure is completed at a subsequent point of time $t_6$, because difference Δ has become zero or minimal, so that at this sixth point of time $t_6$, the formation of the adapted, modeled ambient pressure is deactivated again, and the exhaust-gas recirculation as well as the adaptation of leakage mass flow msagrleck are reactivated. In the times in which the adaptations of leakage air-mass flow msdkleck, of leakage mass flow msagrleck and/or the formation of adapted, modeled ambient pressure pumod are deactivated, in each case the last ascertained value is used for modeling the intake-manifold pressure; prior to the first adaptation or formation, in each case a preset value is used.

A decisive feature for the method of the present invention and the device of the present invention is that adapted, modeled ambient pressure pumod is only formed when the exhaust-gas recirculation is deactivated, and therefore the adaptation of leakage mass flow msagrleck is deactivated, as well. Incidentally, an adaptation of leakage mass flow msagrleck when the exhaust-gas recirculation is deactivated makes no sense. The reason for activating the formation of adapted, modeled ambient pressure pumod only when the exhaust-gas recirculation, and therefore also the adaptation of leakage mass flow msagrleck are inactive, is that particularly in dynamic operating states of internal combustion engine 1, e.g., during acceleration or deceleration, the adaptation of leakage mass flow msagrleck is not stable, i.e., does not completely take effect, as the inventors have recognized. That is why if one were to adapt the modeled, ambient pressure when the exhaust-gas recirculation is active, i.e., when exhaust-gas recirculation valve 10 is open, then the faulty adaptation of leakage mass flow msagrleck would also be compensated in this adaptation, so that the value formed for adapted, modeled ambient pressure pumod could deviate in unwelcome fashion from the actual value for the ambient pressure. The formation of adapted, modeled ambient pressure pumod may also be falsified because of a not yet completed adaptation of leakage mass flow msagrleck, so that for this reason as well, adapted, modeled ambient pressure pumod is formed only when the adaptation of leakage mass flow msagrleck is deactivated.

Furthermore, it is advantageous to activate the formation of adapted, modeled ambient pressure pumod only when the adaptation of leakage air-mass flow msdkleck is deactivated, in order to prevent a not yet adapted leakage air-mass flow msdkleck or an incorrectly adapted leakage air-mass flow msdkleck from likewise falsifying the formation of adapted, modeled ambient pressure pumod.

For the adaptation of leakage mass flow msagrleck via exhaust-gas recirculation valve 10, as well, it holds true that it is advantageously only carried out when both the formation of adapted, modeled ambient pressure pumod and the adaptation of leakage air-mass flow msdkleck via throttle valve 5 are deactivated, in order to prevent a falsification of the adaptation of leakage mass flow msagrleck in the event of a faulty or not yet completed adaptation of the modeled ambient pressure or a faulty or not yet completed adaptation of leakage air-mass flow msdkleck.

Moreover, it may optionally be provided that an error is recognized for the case when adapted leakage air-mass flow msdkleck via throttle valve 5 lies outside of a first predefined range. In this context, the first predefined range may be defined, for example, by a leakage air-mass flow msdkleck below a first predefined threshold value; this first predefined threshold value for adapted leakage air-mass flow msdkleck may be stored in engine management 30 and previously known. The first predefined threshold value for adapted leakage air-mass flow msdkleck may be suitably applied on a test stand, for example, so that with the aid of the first predefined threshold value for adapted leakage air-mass flow msdkleck, it is possible to reliably distinguish between adapted leakage air-mass flows msdkleck that result because of manufacturing tolerances of throttle valve 5, for example, and therefore should be permitted, and such adapted leakage air-mass flows msdkleck which result, for instance, because of dirt in the area of throttle valve 5, so that throttle valve 5 can no longer close completely, and is therefore leaky. The detected error for adapted leakage air-mass flows msdkleck above the first predefined threshold value may then lead to an emergency-operating-mode measure, in which the power output of internal combustion engine 1 is reduced, or, as a last consequence, is switched off.

In corresponding manner, an error may be recognized for the case when adapted leakage mass flow msagrleck via exhaust-gas recirculation valve 10 lies outside of a second predefined range. In this instance, the second predefined range may be defined by a second predefined threshold value that is likewise stored in engine management 30 and preselected. The second predefined range for adapted leakage mass flow msagrleck lies below the second predefined threshold value. The second predefined threshold value may likewise be suitably applied on a test stand, for example, so that it is possible to reliably distinguish between leakage mass flows msagrleck that result because of manufacturing tolerances of the exhaust-gas recirculation valve and should lie below the second predefined threshold value, and such adapted leakage mass flows msagrleck that result because of dirt in the area of exhaust-gas recirculation valve 10, for instance, so that exhaust-gas recirculation valve 10 is no longer able to close completely, and is thus leaky, so that adapted leakage mass flows msagrleck above the second predefined threshold value result. If an error is detected in this way, because adapted leakage mass flow msagrleck lies above the second predefined threshold value, then an emergency-operating-mode measure of internal combustion engine 1 may be initiated, e.g., by reducing or, as a last consequence, by switching off the power output of internal combustion engine 1.

As is discernible from FIGS. 4a) and 4c), leakage mass flow msagrleck via exhaust-gas recirculation valve 10 is only adapted after previous adaptation of leakage air-mass flow msdkleck via throttle valve 5, so that no errors result in the adaptation of leakage mass flow msagrleck because an adaptation of leakage air-mass flow msdkleck has not yet been carried out. In this context, naturally leakage air-mass flow msdkleck only when the exhaust-gas recirculation and the adaptation of leakage mass flow msagrleck are inactive, so that conversely, no errors result in the adaptation of leakage air-mass flow msdkleck because of an active exhaust-gas recirculation or an active adaptation of leakage mass flow msagrleck. For the case when the adaptation of leakage mass flow msagrleck does not adjust to a constant value for adapted leakage mass flow msagrleck, it may also be provided to switch off the adaptation of leakage mass flow msagrleck after a first predefined time has elapsed since activation of the adaptation of leakage mass flow msagrleck, in order to be able to subsequently adapt the modeled ambient pressure. The first predefined time may be stored in engine management 30 and, for example, applied on a test stand in such a way that third integrator 135 has sufficient time for reducing the difference $\Delta$agr to zero or a minimum. For the stipulation of this time, one may also orient himself, for example, for the time t2–t1 necessary for the adaptation of leakage air-mass flow msdkleck. If, after this first predefined time, difference $\Delta$agr is not yet zero or not yet minimal, or adapted leakage mass flow msagrleck has not yet adjusted to a constant value, then after this predefined time, the exhaust-gas recirculation and the adaptation of leakage mass flow msagrleck are deactivated, and the adaptation of the modeled ambient pressure is activated. The formation of adapted, modeled ambient pressure pumod may also be activated in full-load operating states of internal combustion engine 1, in which the exhaust-gas recirculation, and therefore also the adaptation of leakage mass flow msagrleck, is switched off anyway.

During such full-load operating states of internal combustion engine 1, the exhaust-gas recirculation is unwanted because it has the effect of reducing power output, and for this reason is switched off during these full-load operating states. Moreover, it may also be provided to end the adaptation of leakage air-mass flow msdkleck after a second predefined time has elapsed since activation of this adaptation at first point of time $t_1$, regardless of whether the adaptation of leakage air-mass flow msdkleck has taken effect after this second predefined time has elapsed, i.e., difference $\Delta$dk has become zero or minimal. In this case, the second predefined time may likewise be stored in engine management 30 and, for example, have been applied on a test stand in such a way that as a rule, the adaptation of leakage air-mass flow msdkleck is able to take effect within this second predefined time. The stipulation of the second predefined time, as well as the first predefined time, ensures that, at any rate, the adaptation of leakage air-mass flow msdkleck or of leakage mass flow msagrleck is completed sometime or other, so that subsequent adaptations of other quantities such as leakage mass flow msagrleck or the modeled ambient pressure may be carried out. Since throttle valve 5 cannot be switched to inactive, for the case when the adaptation of leakage air-mass flow msdkleck has not yet taken effect after the second predefined time, due to the adaptation of leakage mass flow msagrleck or of the modeled ambient pressure, leakage air-mass flow msdkleck is also adapted, so that in this respect, the adaptation of leakage mass flow msagrleck or of the modeled ambient pressure is incorrect, because adapted leakage mass flow msagrleck resulting does not correspond to the actual leakage mass flow, or the adapted, modeled ambient pressure does not correspond to the actual ambient pressure. After the second predefined time has elapsed since activation of the adaptation of leakage air-mass flow msdkleck, in the above-described case, fill-ascertainment unit 110 then also no longer ascertains the fill on the basis of measured intake-manifold pressure ps, but rather on the basis of modeled intake-manifold pressure psmod.

Thus, according to the present invention, an ambient-pressure sensor is replaced by an adaptation of a modeled ambient pressure that is based on the comparison between measured intake-manifold pressure ps and modeled intake-manifold pressure psmod, and that takes place at regular intervals according to FIGS. 4c) and 4d). These regular intervals are ensured particularly because the exhaust-gas recirculation and the adaptation of leakage mass flow msagrleck are in each case terminated after the first predefined time has elapsed since activation of the exhaust-gas recirculation and of the adaptation of leakage mass flow msagrleck, respectively, regardless of whether the adaptation of leakage mass flow msagrleck has taken effect or not. With the deactivation of the exhaust-gas recirculation or of the adaptation of leakage mass flow msagrleck after the respective expiration of the first predefined time, in each case the adaptation of the modeled ambient pressure is then activated. By the adaptation of the modeled ambient pressure at regular intervals, it is possible to rule out, for example, during uphill driving, that the actual ambient pressure will depart too far from adapted, modeled ambient pressure pumod, and thus modeled intake-manifold pressure psmod, and therefore the ascertainment of the fill by fill-ascertainment unit 110 will become incorrect.

In simplified terms, it was assumed in known methods heretofore that the exhaust-gas back pressure corresponds more or less to ambient pressure pu, the pressure drop via exhaust branch 70, particularly a catalytic converter disposed therein, having been disregarded. It is possible to make the described adaptations of leakage mass flow msagrleck and of the modeled ambient pressure, as well as the modeling of the intake-manifold pressure even more precise if the pressure drop via exhaust branch 70, especially via a catalytic converter located there, is taken into account. For instance, this pressure drop may be ascertained using a further pressure sensor, which, however, is costly, or, for example, may be applied on a test stand for various operating states of internal combustion engine 1, and stored in engine management 30.

Upon start of internal combustion engine 1, measured intake-manifold pressure ps corresponds approximately to ambient pressure pu, so that the adaptation of the modeled ambient pressure from point of time t=0 up to first point of time $t_1$ may also be carried out by equating the adapted, modeled ambient pressure with measured intake-manifold pressure ps, so that less time is necessary for this adaptation of the modeled ambient pressure than for the subsequent adaptations of the modeled ambient pressure as of third point of time $t_3$, in which the modeled ambient pressure is adapted by a control loop, as described with reference to FIG. 3. If leakage air-mass flow msdkleck is then adapted as described in FIG. 4a) as of first point of time $t_1$, and therefore shortly after the start of internal combustion engine 1, this adaptation is carried out on the basis of ambient pressure pu equated with measured intake-manifold pressure ps. Since even in the event of uphill driving, ambient pressure pu cannot change so quickly, the adaptation of leakage air-mass flow msdkleck from first point of time $t_1$ up to second point of time $t_2$ relatively close in time to the start of internal combustion engine 1 is based on a value for adapted, modeled ambient pressure pumod that will probably correspond more or less to the actual ambient pressure. Thus, the adaptation of leakage air-mass flow msdkleck is not invalidated by an adapted, modeled ambient pressure pumod deviating significantly from the actual ambient pressure.

What is claimed is:

1. A method for operating an internal combustion engine having an exhaust-gas recirculation, comprising:
   modeling an intake-manifold pressure and an ambient pressure, the intake-manifold pressure being modeled as a function of the modeled ambient pressure;
   measuring the intake-manifold pressure;
   comparing the modeled intake-manifold pressure to the measured intake-manifold pressure to produce a comparison result; and
   adapting the modeled ambient pressure as a function of the comparison result, the adapting only being carried out when the exhaust-gas recirculation is inactive.

2. The method as recited in claim 1, further comprising:
   modeling the intake-manifold pressure as a function of an air-mass flow via an actuator including a throttle valve, in an air feed of the internal combustion engine;
   comparing the modeled intake-manifold pressure to the measured intake-manifold pressure to produce a second comparison result; and
   adapting a leakage air-mass flow via the actuator in the air feed as a function of the second comparison result.

3. The method as recited in claim 2, further comprising:
   the adapting of the leakage air-mass flow via the actuator in the air feed is performed only when the exhaust-gas recirculation is inactive.

4. The method as recited in claim 2, further comprising:
   recognizing an error if the adapted leakage air-mass flow via the actuator in the air feed lies outside of a first predefined range.

5. The method as recited in claim 2, further comprising:
   modeling the intake-manifold pressure as a function of the leakage air-mass flow via an actuator including an exhaust-gas recirculation valve, in an exhaust-gas recirculation line of the internal combustion engine;
   comparing the modeled intake-manifold pressure to the measured intake-manifold pressure to produce a third comparison result; and
   adapting the leakage air-mass flow via the actuator in the exhaust-gas recirculation line as a function of the third comparison result.

6. The method as recited in claim 5, wherein:
   the leakage air-mass flow via the actuator in the exhaust-gas recirculation line is adapted only after a previous adaptation of the leakage air-mass flow via the actuator in the air feed is performed.

7. The method as recited in claim 5, further comprising:
   recognizing an error if the adapted leakage air-mass flow via the actuator in the exhaust-gas recirculation line lies outside of a first predefined range.

8. The method as recited in claim 1, further comprising:
   switching off the exhaust-gas recirculation one of at full load and after a predefined time has elapsed; and
   subsequently adapting the modeled ambient pressure.

9. A device for operating an internal combustion engine having an exhaust-gas recirculation, comprising:
   a modeling unit for modeling an intake-manifold pressure and an ambient pressure, the modeling unit including an arrangement for modeling the intake-manifold pressure as a function of the modeled ambient pressure;
   a measuring unit for measuring the intake-manifold pressure;
   a comparison unit for producing a comparison result by comparing the modeled intake-manifold pressure to the measured intake-manifold pressure; and
   an adaptation unit for adapting the modeled ambient pressure as a function of the comparison result, the adaptation of the modeled ambient pressure being performed only when the exhaust-gas recirculation is inactive.

* * * * *